US006427301B1

(12) United States Patent
Foster

(10) Patent No.: US 6,427,301 B1
(45) Date of Patent: Aug. 6, 2002

(54) PISTON RING COMPRESSOR TOOL SYSTEM

(76) Inventor: John R. Foster, HD 81 Box 3314, Searsmont, ME (US) 04973

( * ) Notice: Subject to any disclaimer, the term of this patent is extended or adjusted under 35 U.S.C. 154(b) by 0 days.

(21) Appl. No.: 09/732,237

(22) Filed: Dec. 7, 2000

(51) Int. Cl.[7] .......... B23P 15/10
(52) U.S. Cl. .......... 29/222; 29/224; 29/269
(58) Field of Search .......... 29/222, 224, 269

(56) References Cited

U.S. PATENT DOCUMENTS 1,444,072 A * 2/1923 Holland .......... 29/222
1,526,601 A * 2/1925 Hurlburt .......... 29/222
1,767,819 A * 6/1930 Solenberger .......... 29/222
2,155,705 A * 4/1939 Gottwald .......... 29/222
2,286,313 A * 6/1942 Seaholm .......... 29/222
2,553,663 A * 5/1951 Martin .......... 29/222
2,607,092 A * 8/1952 Rubly .......... 29/222
2,697,870 A * 12/1954 Zucker .......... 29/222
3,129,501 A * 4/1964 Wassner .......... 29/222

* cited by examiner

*Primary Examiner*—Joseph J. Hail, III
*Assistant Examiner*—Daniel Shanley

(57) ABSTRACT

The piston ring compressor tool system comprises a compression skirt. The skirt has an interior surface and an exterior surface. It also has an upper edge and a lower edge. The tool system has a hollow, generally tapered, cylindrical tubular form and is further configured in a shape of an upper frustroconical funnel. The funnel forms a planar inlet within the interior of the upper edge. The funnel further forms a lower cylindrically shaped outlet within the interior of the lower edge. The outlet is parallel to the plane of the inlet and is for discharging the piston and ring assembly into a bore. The compression skirt has a generally outwardly curved upper horizontal portion. The lower horizontal portion is generally plumb to the plane of the opening of the lower edge. The middle horizontal area is a transition area between the radian outward curve of the upper horizontal portion and the generally plumb surface of the lower horizontal portion.

6 Claims, 3 Drawing Sheets

FIG 1
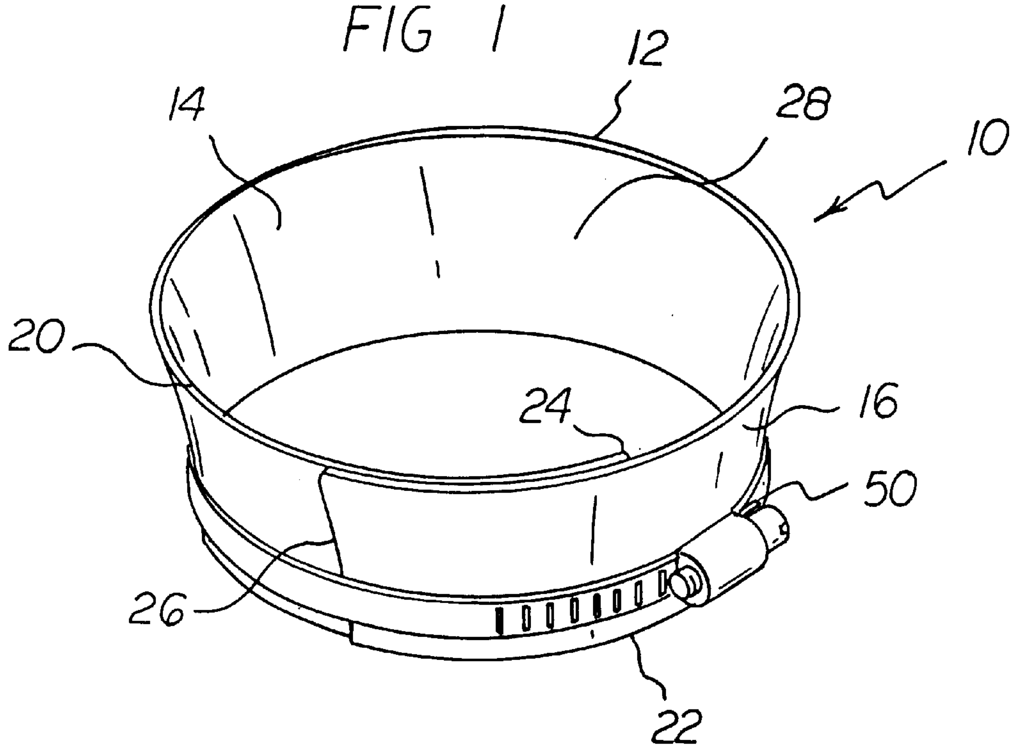
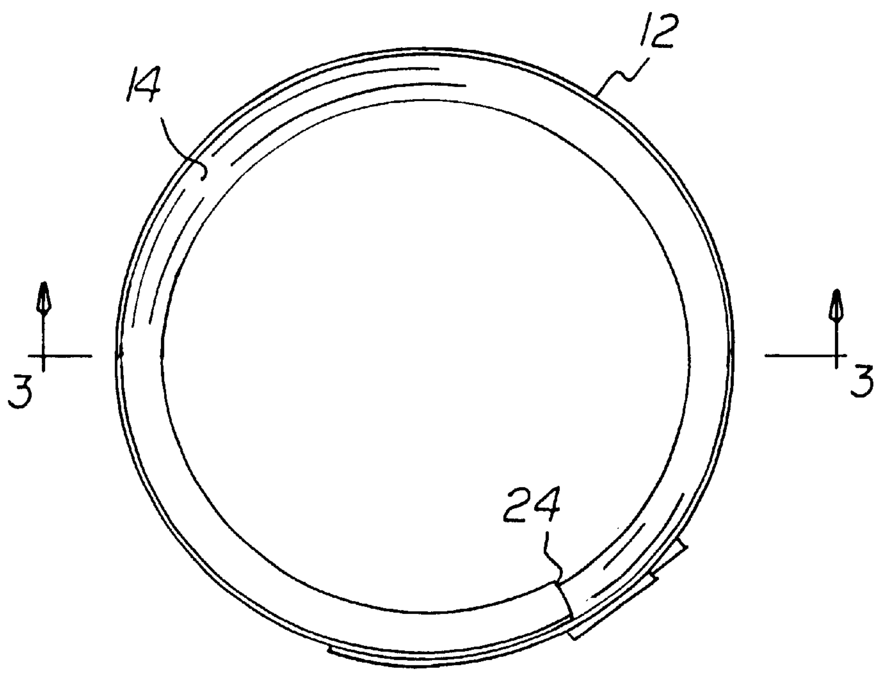
FIG 2

PISTON RING COMPRESSOR TOOL SYSTEM

BACKGROUND OF THE INVENTION

1. Field of the Invention

The present invention relates to a piston ring compressor tool system and more particularly pertains to a safely and conveniently compressing piston rings for easy piston placement into a bore.

2. Description of the Prior Art

The use of known devices and apparatuses for ring compression is known in the prior art. More specifically, known devices and apparatuses for ring compression previously devised and utilized for the purpose of for compressing rings through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,767,507 to Stahlecker issued Oct. 23, 1973. This patent disclosed an apparatus for the manufacture of work pieces constructed as cup-like, upwardly or downwardly tapering containers. U.S. Pat. No. 5,307,714 to Munendlein et al. discloses a device for holding and operating a facing head.

While these devices fulfill their respective, particular objectives and requirements, the aforementioned patents do not describe a piston ring compressor tool system that allows safely and conveniently compressing piston rings for easy piston placement into a bore.

In this respect, the piston ring compressor tool system according to the present invention substantially departs from the conventional concepts and designs of the prior art, and in doing so provides an apparatus primarily developed for the purpose of safely and conveniently compressing piston rings for easy piston placement into a bore.

Therefore, it can be appreciated that there exists a continuing need for a new and improved piston ring compressor tool system which can be used for safely and conveniently compressing piston rings for easy piston placement into a bore. In this regard, the present invention substantially fulfills this need.

SUMMARY OF THE INVENTION

In view of the foregoing disadvantages inherent in the known types of known devices and apparatuses now present in the prior art, the present invention provides an improved piston ring compressor tool system. As such, the general purpose of the present invention, which will be described subsequently in greater detail, is to provide a new and improved piston ring compressor tool system and method which has all the advantages of the prior art and none of the disadvantages.

To attain this, the present invention essentially comprises a piston ring compressor tool system for safely and conveniently compressing piston rings for easy piston placement into a bore. The system comprises, in combination, several components. Firstly, there is a compression skirt which comprises a strip of flexible form-retaining material. The skirt has an interior surface and an exterior surface and peripheral edges formed there between. The peripheral edges include an upper edge, a lower edge and two side edges. The strip is rolled into a hollow, generally tapered, cylindrical tubular form. The tube has overlapping side edges and thereby has an internal edge and an external edge. The overlapping configuration allows for expansion and contraction of the overall radius of the compression skirt during operation and use. The strip is further configured at its upper extent in a shape of a generally outwardly flared upper frustroconical funnel at an angle of between about 10 and 15 degrees. The funnel forms a planar inlet within the interior of the upper edge. The inlet is for receiving a piston and ring assembly. The strip further forms a planar cylindrically shaped outlet at its lower extent within the interior of the lower edge. The outlet is parallel to the plane of the inlet, and is for discharging the piston and ring assembly into a bore of an engine. The compression skirt also has an upper horizontal portion, a middle horizontal portion and a lower horizontal portion. The compression skirt has a generally outwardly curved upper horizontal portion. It also has a lower horizontal portion which is generally plumb to the plane of the opening of the lower edge. The middle horizontal area is a transition area between the radial outward curve of the upper horizontal portion and the generally plumb surface of the lower horizontal portion. Next provided is a compressing ring assembly which is comprised of a flat strip of rigid form-retaining material. The ring device comprises a generally circular configuration. The ring device comprises a compression strap and a compressor mechanism. The compression strap has an upper edge, a lower edge and two side edges. It also comprises an internal surface, an external surface and an edge there between. The surface of the compression strap has a regular surface with parallel slots for receiving the traction from the compressor mechanism. The compressor mechanism in the form of a bolt with threads has a rotatable threaded coupler for pulling on and shortening the circumference of the compression strap. The threads of the rotatable compressor mechanism are configured to mate to, and be in contact with, the slots of the compression strap thereby enabling the compressor mechanism to shorten and lengthen the overall circumference of the compression strap by rotatably shortening and lengthening the circumference of the skirt. Lastly provided is an attachment element, preferably a weld. The attachment weld couples the compressing ring assembly to the outside middle horizontal portion of the compression skirt. This fixation allows the compressing ring assembly to shorten and lengthen the internal radius of the compression skirt by shortening and lengthening the circumference of the compressing ring assembly.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved piston ring compressor tool system which has all of the advantages of the prior art known devices and apparatuses and none of the disadvantages.

It is another object of the present invention to provide a new and improved piston ring compressor tool system which may be easily and efficiently manufactured and marketed.

It is further object of the present invention to provide a new and improved piston ring compressor tool system which is of durable and reliable constructions.

An even further object of the present invention is to provide a new and improved piston ring compressor tool system which is susceptible of a low cost of manufacture with regard to both materials and labor, and which accordingly is then susceptible of low prices of sale to the consuming public, thereby making such piston ring compressor tool system economically available to the buying public.

Even still another object of the present invention is to provide a piston ring compressor tool system for safely and conveniently compressing piston rings for easy piston placement into a bore.

Lastly, it is an object of the present invention to provide a new and improved piston ring compressor tool system. The system comprises a compression skirt. The skirt has an interior surface and an exterior surface. It also has an upper edge and a lower edge. The tool system has a hollow, generally tapered, cylindrical tubular form and is further configured in a shape of an upper frustroconical funnel. The funnel forms a planar inlet within the interior of the upper edge. The funnel further forms a lower cylindrically shaped outlet within the interior of the lower edge. The outlet is parallel to the plane of the inlet and is for discharging the piston and ring assembly into a bore. The compression skirt has a generally outwardly curved upper horizontal portion. The lower horizontal portion is generally plumb to the plane of the opening of the lower edge. The middle horizontal area is a transition area between the radian outward curve of the upper horizontal portion and the generally plumb surface of the lower horizontal portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein FIG. 1 is an overview perspective of the piston ring compressor tool system.

FIG. 2 is a plan of the piston ring compressor tool system of FIG. 1.

The same reference numerals refer to the same parts throughout the various FIGS.

DESCRIPTION OF THE PREFERRED EMBODIMENT

Figure 3:
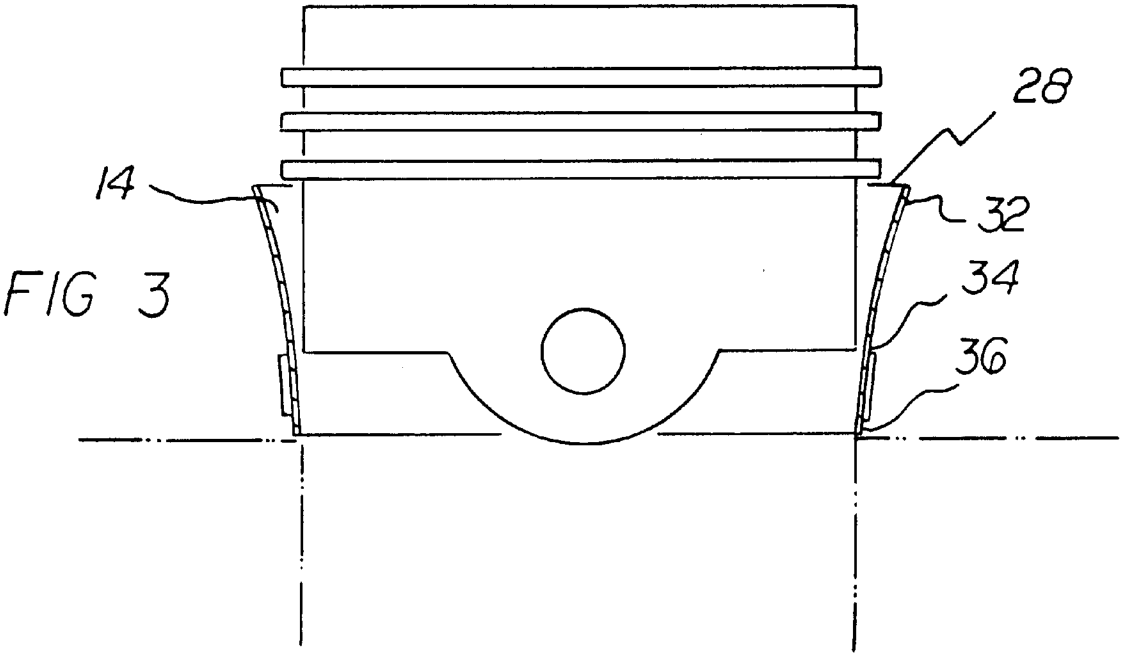
FIG. 3 is a side elevation of the piston ring compressor tool system, demonstrating the piston within the inlet of the tool, taken along line 3—3 of FIG. 2.
Figure 4:
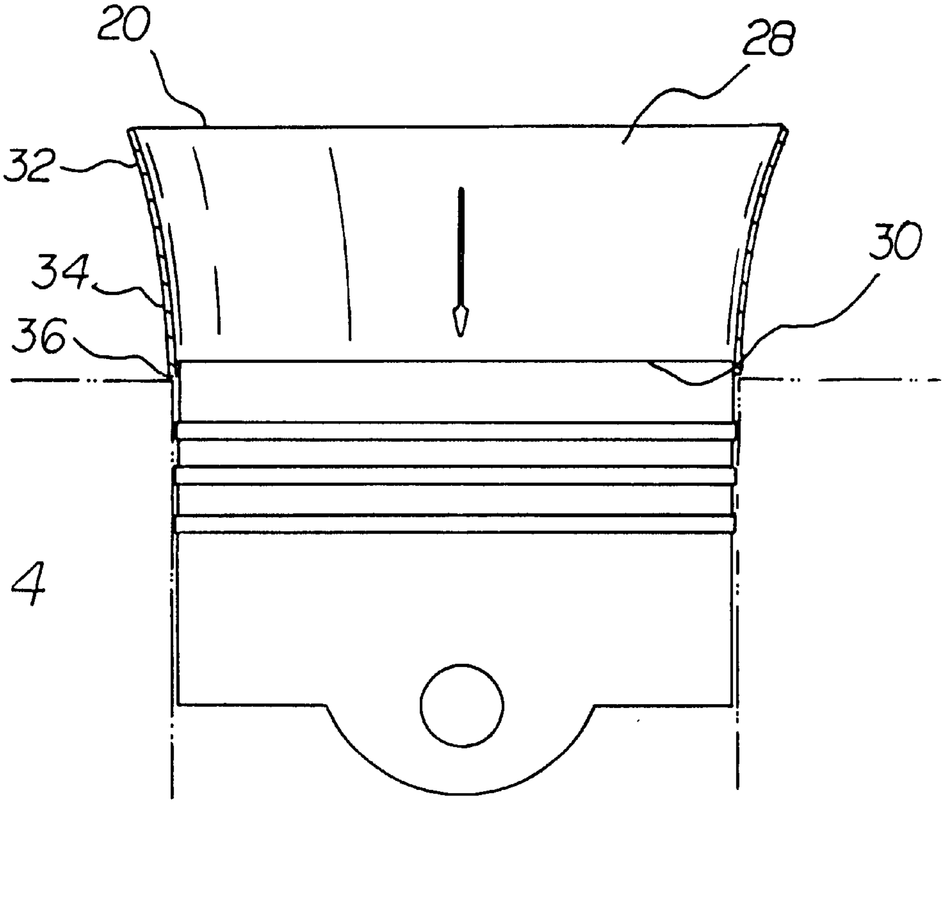
FIG. 4 is a side elevation taken along line 3—3 of FIG. 2 displaying the piston exiting the outlet of the tool, into the bore.
Figure 5:
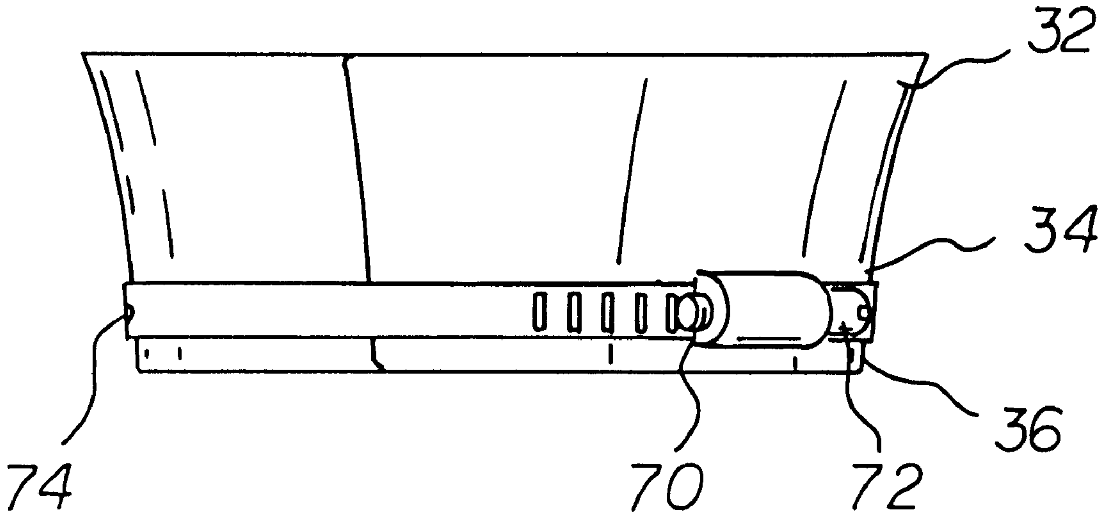
FIG. 5 is a side elevation of the piston ring compressor tool system.

With reference now to the drawings, and in particular to FIG. 1 thereof, the preferred embodiment of the new and improved piston ring compressor tool system embodying the principles and concepts of the present invention and generally designated by the reference numeral 10 will be described.

The present invention, the piston ring compressor tool system 10 is comprised of a plurality of components. Such components in their broadest context include a compressor skirt, a compressing ring assembly, a coupling component and an attachment element. Such components are individually configured and correlated with respect to each other so as to attain the desired objective.

The major component of the system is the compression skirt 12. The compression skirt comprises a strip of flexible form-retaining material having a thickness of between about 0.005 and 0.025 of an inch. The skirt has an interior surface 14 and an exterior surface 16 with peripheral edges formed there between. The peripheral edges include an upper edge 20, a lower edge 22 and two side edges 24, 26.

The strip is rolled into a hollow, generally tapered, cylindrical tubular form having a height of between about 1.25 and 2.0 inches, the height being preferably 1.5 inches. The tubular form has overlapping side edges and thereby has an internal edge 24 and an external edge 26. The overlapping configuration allows for expansion and contraction of the overall radius of the compression skirt during operation and use.

The strip is further configured at its upper extent in a shape of a generally outwardly flared upper frustroconical funnel at an angle of between about 10 and 15 degrees. The funnel forms a planar inlet 28 within the interior of the upper edge. The internal inlet diameter being between about 4 and 8 inches. The upper edge functions by receiving a piston and ring assembly into the funnel. The strip further forms a planar cylindrically shaped outlet 30 at its lower extent within the interior of the lower edge parallel to the plane of the inlet. The outlet has an internal diameter of between about 3 and 6 inches, preferably 5 inches. The outlet functions by compressing the piston rings and discharging the piston and ring assembly into a bore of an engine.

The compression skirt also has an upper horizontal portion 32. This portion occupies the compression skirt area and extends from the upper edge to a location between about 0.50 and 0.75 of an inch, preferably 0.625 of an inch from the lower edge of the compression skirt. The middle horizontal portion 34 occupies the compression skirt area and extends from the lower edge of the upper horizontal portion downwardly, a distance of between about 0.4 and 0.6 of an inch, preferably 0.50 of an inch. There is also provided a lower horizontal portion 36 which occupies the area of the compression skirt extending from the lower edge of the middle horizontal portion to the lower edge of the compression skirt. This is a distance of between about 0.1 and 0.2 of an inch, and preferably 0.12 of an inch.

The compression skirt has a generally outwardly curved upper horizontal portion. The lower horizontal portion is generally plumb to the plane of the opening of the lower edge. The middle horizontal area is a transition area between the radian outward curve of the upper horizontal portion and the generally plumb surface of the lower horizontal portion.

Next provided is a compressing ring assembly 40 which is comprised of a flat strip of rigid form-retaining material, preferably a stainless spring. steel. The ring assembly is comprised of a generally circular configuration having a compression strap 42 and a compressor mechanism 44.

The compression strap comprises a strip of flexible material having a width of between about 0.4 and 0.6 of an inch, preferably 0.50 of an inch. The compression strap has a length of between about 8 and 9 inches, preferably 9 inches. It has a thickness of between about 0.025 and 0.10 of an inch, preferably 0.030 of an inch. The compression strap further comprises an upper edge 46, a lower edge 48 and two side edges 50. There is an internal surface 52, an external surface 54 and upper and lower edges there between.

The surface of the compression strap has a regular surface with parallel slots 60 for receiving traction from the compressor mechanism of the compressing ring assembly. The compressor mechanism 44 of the compressing ring assembly has a rotatable traction threaded coupler 62 for pulling on and shortening the circumference of the compression strap and for lengthening it. Threads of the compressor mechanism are configured to mate to and be in contact with the slots of the compression strap of the compressing ring assembly.

The compression mechanism is preferably a clamping coupler 70 with a rotatable bolt 72 for coupling the compressor mechanism to a fixed location on the compression strap of the compression ring assembly. Rotation of the bolt moves the slots and compression strap to shorten or lessen the coupling component to shorten the overall circumference of the compressing ring assembly and hence the compressor skirt by rotatably shortening or lengthening the circumference.

Lastly, there is provided an attachment element 74, preferably a weld, for coupling the compressing ring assembly at the point of the compressor, to the outside middle horizontal portion of the compression skirt. This attachment element allows the compressing ring assembly to shorten the internal radius of the compression skirt by shortening the circumference of the compressing ring assembly.

One benefit of the instant invention is that one piston ring at a time enters the tool, greatly reducing the drag on the piston and ring assembly, easing installation thus increasing installation efficiency. A second benefit is that the flexible flared or cone-shape above the clamp area provides a gradual ring compression and a lead in for the ring assembly requiring less force to install the piston and ring assembly into the cylinder. A third benefit is achieved because of the conical shape of the tool. Once the clamping diameter is set an infinite number of assemblies of the same diameter can be installed without the need of loosening the clamp as is the case with existing piston ring compressor designs which require adjustment from one assembly installation to another, drastically reducing labor. Finally, inherent to the design is its low profile thereby making for easy storage.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A piston ring compressor tool system for safely and conveniently compressing piston rings for easy piston placement into a bore, comprising, in combination;

a compression skirt comprising an imperforate strip of flexible form-retaining material having an interior surface and an exterior surface and a peripheral edges formed there between including an upper edge and a lower edge and two side edges, the strip being rolled into a hollow generally tapered cylindrical tubular form having overlapping side edges thereby having an internal edge and an external edge, the overlapping configuration allowing for expansion and contraction of the overall radius of the compression skirt during operation and use, the strip being further configured at its upper extent in a shape of a generally outwardly flared upper frustroconical funnel at an angle of between about 10 and 15 degrees and including a continuous upper edge in an essentially circular configuration and with the funnel forming a planar inlet within the interior of the upper edge for receiving a piston and ring assembly and the strip further forming a planar cylindrically shaped outlet at its lower extent within the interior of the lower edge parallel to the plane of the inlet for discharging the piston and ring assembly into a bore of an engine, the compression skirt also having an upper horizontal portion and a middle horizontal portion and a lower horizontal portion, the compression skirt having a generally outwardly curved upper horizontal portion and having a lower horizontal portion and including a continuous lower edge in an essentially circular configuration which is generally plumb to the plane of the opening of the lower edge and having a middle horizontal area which is a transition area between the radial outward curve of the upper horizontal portion and the generally plumb surface of the lower horizontal portion whereby the interior surface decreases in diameter from the upper edge to the lower edge over at least the majority of the length of the skirt;

a compressing ring assembly comprised of a flat strip of rigid form-retaining material comprising a generally circular configuration having a compression strap and a compressor mechanism, the compression strap having an upper edge and a lower edge and two side edges and an internal surface and an external surface and an edge there between, the surface of the compression strap having a regular surface with parallel slots for receiving the traction from the compressor mechanism, the compressor mechanism, having a rotatable threaded coupler in the form of a bolt with threads for pulling on and shortening the circumference of the compression strap, the threads of the rotatable compressor mechanism being configured to mate to and be in contact with the compression strap thereby enabling the compressor mechanism to shorten and lengthen the overall circumference of the compression strap by rotatably shortening and lengthening the circumference of the skirt; and an attachment weld coupling the compressing ring assembly to the outside middle horizontal portion of the compression skirt allowing the compressing ring assembly to shorten and lengthen the internal radius of the compression skirt by shortening and lengthening the circumference of the compressing ring assembly.

2. A piston ring compressor tool system, comprising:

an imperforate compression skirt having an interior surface and an exterior surface and an upper edge and a lower edge having a hollow generally tapered cylindrical tubular form being further configured in a shape of an upper frustroconical funnel with the funnel forming a continuous upper edge in an essentially circular configuration with planar inlet within the interior of the upper edge with the internal inlet and further forming a lower cylindrically shaped outlet with a continuous lower edge in an essentially circular configuration and with the outlet within the interior of the lower edge parallel to the plane of the inlet for discharging the piston and ring assembly into a bore, the compression skirt having a generally outwardly curved upper horizontal portion and having a lower horizontal portion which is generally plumb to the plane of the opening of the lower edge and having a middle horizontal area which is a transition area between the radian outward curve of the upper horizontal portion and the generally plumb surface of the lower horizontal portion whereby the interior surface decreases in diameter from the upper edge to the lower edge over at least the majority of the length of the skirt.

3. A piston ring compressor tool system as described in claim 2 wherein the compression skirt comprises a strip of flexible form-retaining material, the strip being rolled into a hollow generally tapered cylindrical tubular form having overlapping side edges the overlapping configuration allowing for expansion and contraction of the overall radius of the compression skirt during operation and use.

4. A piston ring compressor tool system as described in claim 2 wherein there is further provided a compressing ring assembly comprised of a flat strip of flexible form-retaining material in a generally circular configuration having a compression strap and a compressor mechanism, the surface of the compression strap having an regular surface with slots for receiving the compressor mechanism, the compressor mechanism having a rotatable bolt and threads for pulling on and shortening the circumference of the compression strap, the threads of the bolt being configured to mate to and be in contact with the slots of the compression strap.

5. A piston ring compressor tool system as described in claim 2 wherein there is further provided an attachment element for coupling the compressing ring assembly at the point of the compressor compression skirt allowing the compressing ring assembly to shorten and lengthen the internal radius of the compression skirt by shortening and lengthening the circumference of the compressing ring assembly.

6. A piston ring compressor tool system as described in claim 2 wherein there is further provided an attachment element for coupling the compressing ring assembly at the point of the compressor compression skirt allowing the compressing ring assembly to shorten and lengthen the internal radius of the compression skirt by shortening and lengthening the circumference of the compressing ring assembly.

* * * * *